though essentially undiminished, is not very useful.

United States Patent Office 2,813,802
Patented Nov. 19, 1957

2,813,802

INFRA-RED FILTER MEDIA

George W. Ingle, Hampden, Mass., and William B. Tuemmler, Dayton, Ohio, assignors to Monsanto Chemical Company, St. Louis, Mo., a corporation of Delaware No Drawing. Application February 24, 1955,
Serial No. 490,435

11 Claims. (Cl. 117—33.3)

This invention relates to ways and means for screening out infra-red radiation. More specifically, this invention relates to novel products and compositions which are pellucid (i. e., transparent or translucent) to visible radiation, and at the same time appreciably opaque to infra-red radiation. A preferred embodiment of the invention relates to products or compositions which will filter out (i. e., reflect and/or absorb) infra-red radiation to a greater extent than visible radiation.

It is well known that the human eye is responsive to radiation having wave lengths between about 380 and about 780 millimicrons. This range of wave lengths is generally termed the "visible spectrum." The most common sources of visible radiation are high-temperature bodies, such as the sun, tungsten filaments, etc., which emit radiation over a considerably broader range of wave lengths than the visible spectrum. For example, only about 37.5 percent of the radiant energy from the sun is transmitted within the visible spectrum, whereas greater than 45 percent of its radiation is transmitted in the so-called near infra-red region (i. e., from about 700 to about 2500 millimicrons). Radiation from a hot tungsten source has an even greater proportion of its energy distributed in the infra-red region. Thus, our common light sources transmit large proportions of energy which serve no useful purpose with respect to illumination, but which contribute markedly to the development of heat in the body receiving the radiation.

Under many circumstances, it would be very advantageous to be able to receive the full benefit of visible radiation without having to receive the non-visible radiation as well. This is particularly true where a combination of good illumination and low temperature is required. For example, in automotive window glass, and especially in windshields, it is necessary that radiation in the visible portion of the spectrum be transmitted unscattered and essentially undiminished, while the automobile would be much more comfortable for the occupants if all of the non-visible radiation could be filtered out by the window glass. It would be particularly desirable if the infra-red radiation could be filtered by reflection from the surface of the window, rather than absorption by the window, since the absorptive filtration results in increasing the heat content of the window—with consequent release of at least a portion of said heat into the interior of the automobile. Thus, for use in connection with automobile windows, reflective filtering is preferable to absorptive filtering of infra-red radiation.

Considerations similar to the foregoing are applicable also to windows and sky lights of residential, commercial and industrial buildings, except that such windows do not always require non-scattered transmission of radiation in the visible spectrum.

In sun glasses, welder's goggles, and the like, the problem is slightly different in that the total transmission of visible radiation is purposely reduced by as much as 60 or 70 percent or more. Many of the materials used to reduce the transmission of the visible spectrum allow infra-red radiation to pass through essentially undiminished. The use of such materials can result in severe injury to the eye because the iris of the eye responds to the reduction of transmission of visible radiation by opening more widely, thereby allowing a much greater than normal intensity of infra-red radiation to reach the retina.

From the foregoing, it is readily apparent that there are many uses for a material which will serve to block out the transmission of infra-red radiation.

Accordingly, it is an object of the present invention to provide products, materials and means for reducing the transmission of that portion of the spectrum known as the infra-red region. It is a further object of the invention to provide such products, materials and means for reducing infra-red radiation transmission to a greater extent or degree than the reduction of visible radiation transmission. A further object of the invention is to provide products, materials and means in which at least an appreciable amount of the infra-red radiation is filtered out by reflection. Other objects will be apparent from the description set forth hereinafter.

It has now been found that the infra-red portion of radiation can be effectively reduced by transmitting said radiation through a solid, pellucid material containing, or having physically associated therewith, a bis(p-aminophenyl)vinylcarbonium compound of the class

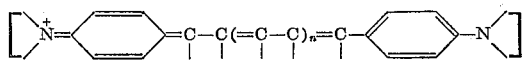

wherein $n$ is equal to 0, 1, 2 or 3, said compound having an acid attached to one of the non-terminal carbon atoms of the linear chain joining the aromatic rings, said acid being stronger than the conjugate acid of the free base derived from the carbonium compound.

It should be recognized that the foregoing charged molecule can be represented equally well by a structure such as:

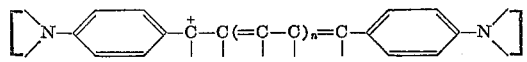

The molecule is in a state of continual resonance, and the charge indicated as associated with a nitrogen atom or a carbon atom is actually associated with the molecule as a whole.

The term "acid" is used herein in accordance with the broad generalized definition—as a substance which can employ a lone pair of electrons from another molecule in completing the stable group of electrons of one of its own atoms. Accordingly, the term "acid" includes not only the well known proton acids (i. e., acids which dissociate in aqueous solution to give hydrogen ions) but also includes the so-called "Lewis acids," e. g., boron trichloride. Thus, the present class of carbonium compounds can also be represented as

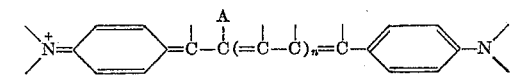

wherein $n$ is as defined above and A is the acid. It should be recognized that A could be attached equally well to any of the other non-terminal methine carbon atoms.

When the acid, A, is a proton acid, such as HX, which dissociates to a hydrogen ion and an anion, X⁻, the carbonium compound becomes

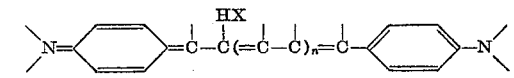

which can be written in the more conventional manner as

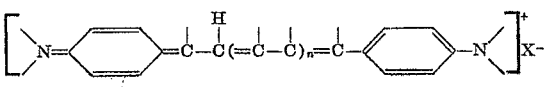

since the anion, X⁻, is no longer associated with the hydrogen ion, but with the entire positively charged carbonium ion. In accordance with the earlier definition of the acid, A, the anion, X⁻, is the anion of any proton acid having a strength greater than the conjugate acid of the free base derived from the carbonium compound.

From the foregoing, it is seen that the cation is the functional portion of the molecule, and that the anion is relatively immaterial—being important only to the extent that variations therein will cause slight changes in the physical properties, such as solubility, melting point, etc. Examples of suitable anions are those from the following acids: perchloric acid, p-toluenesulfonic acid, trichloroacetic acid, trifluoroacetic acid, p-dodecylbenzenesulfonic acid, heptafluorobutyric acid, ethanesulfonic acid, hydrochloric acid, hydrobromic acid, orthophosphoric acid, diphenyl-p,p'-disulfonic acid, sulfanilic acid, carboxybenzenesulfonic acid, etc.

When the present compounds are prepared from the Lewis acids instead of proton acids, the functional portion of the compound is not an ionized molecule but rather a neutral molecule. For example, if boron trichloride is used as the acid, the resulting compound can be represented as follows:

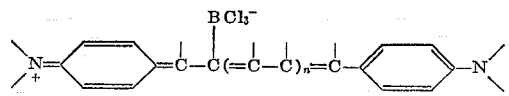

While it is still convenient to picture the compound as having a positive charge (which can be considered as resonating from end to end of the molecule), coordination of the boron trichloride group with the molecule gives rise to a negative charge, thus making the overall molecule neutral. Typical of suitable Lewis acids for use in forming the compounds of the present invention are aluminum bromide, aluminum chloride, stannic chloride, zinc chloride, etc.

The identity of other substituents of the molecule—i. e., substituents upon the essential structure shown above—is of relatively little importance. Variations in these substituents will have minor effects in shifting the position (with respect to wave length) of the maximum intensity of reflected or absorbed radiation, may cause variations in intensities of reflected or transmitted radiation, may give rise to other less intense absorption or reflection bands, may cause broadening or narrowing of the absorption and reflection bands, etc. However, these variations will be of a minor nature, so that the overall molecule will still retain the essential characteristics necessary for use according to the present invention.

Preferred substituents for attachment to the nitrogen atoms of the present compounds are alkyl hydrocarbyl groups, especially lower alkyl groups such as methyl, ethyl, isopropyl, n-propyl, n-butyl, 2-ethylhexyl, etc., but other substituents such as hydrogen atoms, or higher alkyl groups such as cetyl or stearyl groups, other hydrocarbyl groups such as alkenyl, aryl, aralkyl or alicyclic radicals, or hydrocarbyl radicals substituted with groups such as hydroxy, alkoxy, sulfonic acid, halo (especially chloro), amino, nitro groups, etc., are also suitable.

Preferred substituents for attachment to the terminal methine carbon atoms are aryl groups, especially aryl groups substituted with halo, especially chloro, amino, hydroxy, alkoxy, N-alkyl and N,N-dialkylamino groups, etc., but other substituents, such as those mentioned with respect to the nitrogen atom substituents of the foregoing paragraph, are also suitable.

Preferred substituents for attachment to the other non-terminal methine carbon atoms (i. e., other than the one to which the acid is attached) are hydrogen atoms or lower alkyl groups such as mentioned above, but other substituents, e. g., those listed in the preceding two paragraphs, are acceptable—and under some circumstances are even desirable.

Examples of typical compounds of the above-described class are 1,3-bis(4-aminophenyl)vinylcarbonium perchlorate; 1,5-bis(4-aminophenyl)divinylcarbonium trifluoroacetate; 1,7-bis(4-aminophenyl)trivinylcarbonium dodecylbenzenesulfonate; 1,5 - bis[4 - (N,N-dimethylamino)-phenyl]-3,4 - dimethyldivinylcarbonium heptafluorobutyrate; 1 - [4 - (N,N - diethylamino)phenyl] - 7 - [4-(N,N-dimethylamino)phenyl]-1-phenyl-3-ethyl-7-(4 - chlorophenyl)trivinylcarbonium orthophosphate; 1,1,5,5-tetrakis[4-(N,N-dimethylamino)phenyl]-3-(4-chlorophenyl)divinylcarbonium perchlorate; 1,7-bis{4-[N,N-di-(2-hydroxyethyl)amino]phenyl}-1,7-bis(2-chloroethyl)-4-(4 - nitrophenyl)trivinylcarbonium chloride; 1,1,7,7-tetrakis[4-(N,N-diethylamino)phenyl]trivinylcarbonium aluminum chloride; 1,5-bis[4-(N-methylamino)phenyl]-1-(4-chlorophenyl)divinylcarbonium boron trichloride; etc.

A typical method by which the foregoing and similar carbonium compounds can be prepared involves the reaction of equimolar quantities of a p-aminophenylalkene of the class

and a p-aminophenyl aldehyde (or ketone) of the class

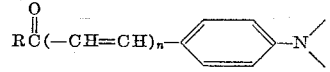

wherein n is equal to 0, 1, 2 or 3, and wherein R may be either a hydrogen atom or an organic radical. These materials are allowed to react in a non-aqueous solvent, such as acetic acid or acetic anhydride, and the acid (the salt of which it is desired to form) is added to the reaction mixture. It is believed that an allene compound of the type

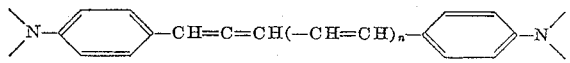

is first formed as an intermediate, which then reacts with the acid to form the desired carbonium compound.

An alternative method of preparation which can be used in making symmetrical compounds having 5 or more methine carbon atoms in the polymethine chain involves the reaction of 2 molar proportions of a p-aminophenyl alkene of the class

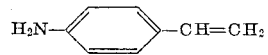

with one mole of an orthoester (or vinylogue thereof) of the class

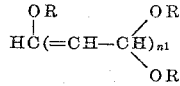

wherein $n_1$ is equal to 0, 1, 2 or 3. The procedure to be followed in this method is very much like the above-described method in that the reactants are allowed to react in a non-aqueous solvent, with the addition of acid to form the desired carbonium compound.

The following examples are illustrative of the preparation of typical carbonium compounds used according to the present invention.

EXAMPLE 1

*1,1,3,3-tetrakis[4-(N,N-dimethylamino)phenyl] vinylcarbonium perchlorate*

A mixture of 1.33 grams of 1,1-bis[4-(N,N-dimethylamino)phenyl]ethylene and 1.33 grams of 4,4'-bis(N,N-dimethylamino)benzophenone was treated with 10 ml. of phosphorus oxychloride. Reaction began immediately, with the evolution of heat and the development of a dark green-blue color. The mixture was placed on a steam bath for 5 hours, during which time the mixture turned red. Fifteen ml. of acetic acid was then added to the cooled mixture, which was then poured into 250 ml. of distilled water. The resulting dark red solution was treated with 3.0 grams of potassium perchlorate, followed by the gradual addition of solid sodium acetate until the mixture assumed a blue-green color and a precipitate began to form. The mixture was allowed to stand at room temperature for about an hour, during which time a dark purple solid formed. This solid was collected, washed with water and dissolved in warm methanol to give a deep blue solution which was then treated with 200 ml. of ether. Upon cooling the ether mixture, a precipitate was collected. Further washing with ether gave a 46 percent yield (based upon the benzophenone) of reddish-brown 1,1,3,3 - tetrakis[4 - (N,N-dimethylamino)-phenyl]vinylcarbonium perchlorate, melting with decomposition at about 238° C.

EXAMPLE 2

*1,1,5,5-tetrakis[4-(N,N-dimethylamino)phenyl] divinylcarbonium perchlorate*

Twenty-two and one-tenth grams of 1,1-bis[4-(N,N-dimethylamino)phenyl]ethylene and 8.3 ml. of ethyl orthoformate were mixed in 50 ml. of acetic anhydride to form a slurry. To this slurry there was added 5.57 grams of 72 percent aqueous perchloric acid dissolved in 50 ml. of acetic anhydride. The resulting mixture was heated, with gentle agitation, until the mixture became homogenous. The mixture was allowed to stand for about 2½ hours, after which time an additional 8.3 ml. of ethyl orthoformate was added. After an additional 45 hours the precipitated solid was collected and washed consecutively with acetic acid and ether. There was obtained a 96 percent yield of golden-brown 1,1,5,5-tetrakis[4-(N,N-dimethylamino)phenyl]divinylcarbonium perchlorate, melting with decomposition at 228–229.5° C.

EXAMPLE 3

*1,1,7,7-tetrakis[4-(N,N-dimethylamino) phenyl] trivinylcarbonium perchlorate*

To a mixture of 1.33 grams of 1,1-bis[4-(N,N-dimethylamino)phenyl]ethylene and 0.5 ml. of 1,3,3-trimethoxypropene was added 5 ml. of acetic acid followed by 0.31 gram of 72 percent aqueous perchloric acid dissolved in 5 ml. of acetic anhydride. Reaction started immediately, with the evolution of heat and development of an intense blue-black color. The mixture was allowed to stand at room temperature for about 2½ hours, after which time another 0.5 ml. of trimethoxypropene was added. After an additional one and one-half hours 30 ml. of anhydrous ether was added and the mixture was cooled to form a solid precipitate. The precipitate was washed with a total of 50 ml. of a 1:4 mixture of acetic anhydride and ethyl ether, washed further with pure ether, and then dried in a vacuum to give a 96 percent yield (based on perchloric acid) of finely divided, brown 1,1,7,7-tetrakis[4-(N,N - dimethylamino)phenyl]trivinylcarbonium perchlorate, melting with decomposition at 224–226° C.

EXAMPLE 4

*1,3-bis[4-(N,N-dimethylamino)phenyl]-1,3-bis(phenyl) vinylcarbonium perchlorate*

A mixture of 2.23 grams of 1-phenyl-1-[4-(N,N-dimethylamino)phenyl]ethylene, 2.25 grams of 4-(N,N-dimethylamino)benzophenone and 20 ml. of phosphorus oxychloride was heated, with agitation, for 5 hours at about 100° C. The resulting deep red mixture was cooled, treated with 28 ml. of acetic acid, poured into 500 ml. of distilled water, and treated with 6 grams of sodium perchlorate, followed by gradual addition of solid sodium acetate until a precipitate formed. The precipitate was separated from the mixture, redissolved in warm ethanol and slowly cooled to give a precipitate of bronze crystals. These crystals were washed first with ice-cold ethanol, then with ether, and then dried to give a golden-brown solid, melting at 150–160° C. Further purification by boiling in 100 ml. of absolute alcohol, cooling the mixture to room temperature, collecting the resulting coppery precipitate, repeatedly washing the precepitate with ethanol and ether, and drying in a vacuum gave 1,3-bis[4-(N,N-dimethylamino)phenyl]-1,3-bis(phenyl)vinylcarbonium perchlorate, melting with decomposition at 204–207° C.

EXAMPLE 5

*1,5-bis[4-(N,N-dimethylamino)phenyl]-1,5-bis(phenyl) divinylcarbonium perchlorate*

A mixture of 11.2 grams of 1-[4-(N,N-dimethylamino)phenyl]-1-phenylethylene, 5.0 ml. of ethyl orthoformate and 25 ml. of acetic anhydride was treated with a solution of 3.30 grams of 72 percent aqueous perchloric acid in 25 ml. of acetic anhydride. This mixture was heated in a water bath at about 85–95° C. for one hour, after which another 5.0 ml. of ethyl orthoformate was added. The mixture was then allowed to stand at room temperature for three hours, after which it was treated with acetic acid and ether to form a precipitate which was collected and washed with acetic acid followed by ether to give a crude rust-colored product. The product was further purified by dissolving in 250 ml. of boiling acetic acid, filtering, reheating and allowing to cool slowly. A precipitate was formed upon cooling, which, after washing consecutively with acetic acid, ethanol and ether, gave large golden-brown crystals of 1,5-bis[4-(N,N-dimethylamino)phenyl]-1,5 - bis-(phenyl)divinylcarbonium perchlorate, melting with decomposition at 210–211° C.

EXAMPLE 6

*1,7-bis[4-(N,N-dimethylamino)phenyl]-1,7-bis(phenyl) trivinylcarbonium perchlorate*

A mixture of 2.23 grams of 1-[4-(N,N-dimethylamino)phenyl]-1-phenylethylene, 1.0 ml. of 1,3,3-trimethoxypropene and 5 ml. of acetic anhydride was treated with a solution of 0.65 gram of 72 percent aqueous perchloric acid dissolved in 10 ml. of acetic anhydride. The mixture was agitated at room temperature for about 3 minutes, and then chilled in ice for 15 minutes. A precipitate formed, which was separated from the mixture, washed consecutively with ethanol and ether and then dried. The resulting product, 1,7-bis[4-(N,N-dimethylamino)phenyl]-1,7 - bis(phenyl)trivinylcarbonium perchlorate, melting with decomposition at 180–181° C., was obtained in about 56 percent yield, based upon perchloric acid.

EXAMPLE 7

*1,1,3 - tris[4 - (N,N - dimethylamino)phenyl] - 3 - (phenyl)vinylcarbonium perchlorate*

A mixture of 1.33 grams of 1,1-bis[4-(N,N-dimethylamino) phenyl]ethylene, 1.13 grams of 4-(N,N-dimethylamino)benzophenone and 10 ml. of phosphorus oxychloride was heated for 5 hours at about 100° C. The resulting dark red mixture was cooled, treated with 15 ml. of acetic acid, and poured into 250 ml. of water containing about 3 grams of sodium perchlorate. Solid sodium acetate was gradually added to the resulting dark reddish-brown mixture until a precipitate had formed and the solution had a blue-green appearance. The precipitate was separated from the solution, washed thoroughly with distilled water and dried. Further purification of the crude product by dissolution in 50 ml. of pyridine, precipitation by addition of 100 ml. of ether, and finally recrystallization from 175 ml. of absolute alcohol yielded golden-brown 1,1,3 - tris[4 - (N,N - dimethylamino)phenyl] - 3 - (phenyl)vinylcarbonium perchlorate, melting with decomposition at 210–212° C.

EXAMPLE 8

*1,1,3 - tris[4 - (N,N - dimethylamino)phenyl]vinylcarbonium perchlorate*

A mixture of 1.33 grams of 1,1-bis[4-(N,N-dimethylamino) phenyl]ethylene and 1.2 grams of 4-(N,N-dimethylamino)benzaldehyde was treated with 10 ml. of acetic acid, followed by a mixture of 0.65 gram of 72 percent aqueous perchloric acid dissolved in 10 ml. of acetic anhydride. The resulting blue solution was allowed to stand at room temperature for about 5 days. Ether was added and the mixture was allowed to stand another day during which time a solid precipitated from the solution. The precipitate was collected, washed with ether and recrystallized by dissolving in 50 ml. of warm acetic anhydride, followed by cooling and dilution with about 50 ml. of ether. The mixture was chilled, and the resulting precipitate was collected and repeatedly washed with ether. Further purification by recrystallization from 25 ml. of acetic acid, boiling in 100 ml. of ethanol, cooling, and recrystallizing from 150 ml. of absolute alcohol yielded finely divided, green 1,1,3-tris[4-(N,N-dimethylamino)phenyl]vinylcarbonium perchlorate, melting with decomposition at 195.5–197.0° C.

EXAMPLE 9

*1,5 - bis[4 - (N,N - dimethylamino)phenyl] - 1,5 - bis(4-chlorophenyl)-divinylcarbonium perchlorate*

A mixture of 1.29 grams of 1-[4-(N,N-dimethylamino)-phenyl]-1-(4-chlorophenyl)ethylene, 1.0 ml. of ethyl orthoformate and 5.0 ml. of acetic anhydride was treated with a solution of 0.33 gram of 72 percent aqueous perchloric acid in 5 ml. of acetic anhydride. The mixture was allowed to stand at room temperature for about 10 minutes. It was then heated on a steam bath for 7 minutes, cooled, and chilled in ice. A dark precipitate was collected and washed with ether and recrystallized from 80 ml. of acetic acid. Further purification by washing consecutively with acetic acid and ether, followed by drying, yielded red-brown, coppery crystals of 1,5-bis[4-(N,N - dimethylamino)phenyl] - 1,5 - bis(4 - chlorophenyl)divinylcarbonium perchlorate, melting at 217–219° C.

EXAMPLE 10

*1,5 - bis[4 - (N,N - dimethylamino)phenyl] - 1,5 - bis-(phenyl)divinylcarbonium p-toluenesulfonate*

A solution of 1.85 grams of p-toluenesulfonic acid monohydrate in 25 ml. of acetic anhydride was added to a mixture of 4.5 grams of 1-[4-(N,N-dimethylamino)-phenyl]-1-phenylethylene and 14.0 ml. of ethyl orthoformate. The mixture was heated on a steam bath for 20 minutes, then cooled and diluted with ether to induce crystallization. The resulting precipitate was collected, washed with ether and recrystallized from a mixture of 35 ml. of ethanol and 20 ml. of water. The crystallization product was further washed with 40 ml. of an equivolume mixture of ethanol and ether, followed by washing with pure ether, to give reddish-brown 1,5-bis[4-(N,N-dimethylamino)phenyl] - 1,5 - bis(phenyl)divinylcarbonium p-toluene sulfonate, melting at 199–200° C.

EXAMPLE 11

*1,1,5,5 - tetrakis[4 - (N,N - dimethylamino)phenyl]divinylcarbonium p-toluenesulfonate*

A mixture of 1.33 grams of 1,1-bis[4-(N,N-dimethylamino)phenyl]ethylene and 1.0 ml. of ethyl orthoformate was treated with 5 ml. of acetic anhydride followed by a solution of 0.45 gram of p-toluenesulfonic acid monohydrate in 10 ml. of acetic anhydride. After about 15 minutes, 8 ml. of acetic acid was added to the mixture. The mixture was allowed to stand overnight at room temperature, during which time a solid precipitated from the solution. Recrystallization of the solid from ethanol gave reddish-brown 1,1,5,5 - tetrakis[4 - (N,N - dimethylamino)phenyl]divinylcarbonium p-toluenesulfonate, melting at 200–205° C.

EXAMPLE 12

*1,7 -bis[4 - (N,N -dimethylamino)phenyl] - 1,7 - bis(2,4-dichlorophenyl)trivinylcarbonium perchlorate*

A mixture of 5.84 grams of 1-[4-(N,N-dimethylamino)phenyl]-1-(2,4-dichlorophenyl)ethylene, 2.0 ml. of 1,3,3-trimethoxypropene and 10 ml. of acetic anhydride was treated with 1.36 grams of 72 percent aqueous perchloric acid dissolved in 10 ml. of acetic anhydride. Reaction began immediately, as evidenced by evolution of heat and formation of a bronze precipitate. After less than a minute, the mixture was cooled, treated with ether, and the precipitate was collected. The precipitate was washed consecutively with ethanol and ether to give brown 1,7-bis[4 - (N,N - dimethylamino)phenyl] - 1,7 - bis(2,4 - dichlorophenyl)trivinylcarbonium perchlorate, melting at 203–204° C.

EXAMPLE 13

*1,7 - bis[4 - (N,N - dimethylamino)phenyl] - 1,7 - bis(4-chlorophenyl)trivinylcarbonium perchlorate*

A mixture of 5.2 grams of 1-[4-(N,N-dimethylamino)-phenyl]-1-(4-chlorophenyl)ethylene, 2.0 ml. of freshly distilled 1,3,3-trimethoxypropene and 10 ml. of acetic anhydride was treated with a solution of 1.36 grams of 72 percent aqueous perchloric acid in 20 ml. of acetic anhydride. Immediate reaction was evidenced by considerable evolution of heat and precipitation of a solid product. After 1 minute the mixture was cooled in ice, and ether was added. The precipitate was collected, washed with ethanol and then washed with ether to yield reddish-brown, crystalline 1,7 - bis[4 - (N,N - dimethylamino)phenyl]-1,7 - bis(4 - chlorophenyl)trivinylcarbonium perchlorate, melting with decomposition at 195–196° C.

EXAMPLE 14

*1,1,5,5 - tetrakis[4 - (N - benzyl - N - methylamino)-phenyl]divinylcarbonium perchlorate*

A mixture of 5 grams of 1,1-bis[4-(N-benzyl-N-methylamino)phenyl]ethylene, 1.5 ml. of ethyl orthoformate and 15 ml. of acetic anhydride was treated with a solution of 0.83 gram of 72 percent aqueous perchloric acid in 15 ml. of acetic anhydride. The resulting deep blue mixture was warmed briefly to dissolve all of the solids, and then allowed to stand overnight, during which time a precipitate was formed. Further agitation caused rapid crystallization of a coppery solid. The precipitate was collected and washed first with acetic acid and then with ether. Further purification was carried out by dissolving the precipitate in acetone, filtering the solution and then adding ethanol to the filtrate. Most of the acetone was then boiled off, and the solution was allowed to stand several days, during which time lustrous, purple-red crystals separated. This solid was washed with ethanol and dried to give 1,1,5,5 - tetrakis[4 - (N - benzyl - N - methylamino)-phenyl]divinylcarbonium perchlorate, melting at 135–137° C.

EXAMPLE 15

*1,5-bis(4-N,N-dimethylaminophenyl)-1,5-bis(2,4-dichlorophenyl)-divinylcarbonium perchlorate*

A mixture of 2.9 grams of 1-[4-(N,N-dimethylamino)-phenyl]-1-(2,4-dichlorophenyl)ethylene, 1.0 ml. of ethyl orthoformate and 5 ml. of acetic anhydride was treated with a solution of 0.68 gram of 72 percent aqueous perchloric acid in 5 ml. of acetic anhydride. The mixture was allowed to stand at room temperature for several minutes, then was warmed for 3 or 4 minutes and then was cooled and poured into water, whereupon a black tar-like material separated from the solution. The tar-like material was dissolved in acetone, and a reddish-brown crystalline material was precipitated by the addition of a little ether. This crystalline material was collected, washed with ether, recrystallized from acetic acid and further recrystallized from ethanol to yield golden needles of 1,5-bis[4-(N,N-dimethylamino)phenyl]-1,5-bis(2,4-dichlorophenyl)divinyl carbonium perchlorate, melting with decomposition at about 230° C.

EXAMPLE 16

*1,1,5,5 - tetrakis[4-(N,N-dimethylamino)phenyl]divinylcarbonium trichloroacetate*

A suspension of 4.96 grams of 1,1,5,5-tetrakis[4-(N,N-dimethylamino)phenyl]divinylcarbonium perchlorate (see Example 2) in 50 ml. of ethanol was treated with a total of 20 ml. of 5 percent aqueous sodium hydroxide. The mixture was then warmed on a steam bath until it became turbid and was then cooled. Benzene was added until a homogeneous amber mixture was formed. The benzene solution was washed four times with water, and the aqueous washings were washed with benzene. The combined benzene solutions were concentrated under reduced pressure, and fresh benzene was added to bring the solution up to 500 ml. (This solution is referred to in this and the following Examples 17 through 21 as the "color base stock solution." To 50 ml. of the above-described color base stock solution was added 125 mg. of trichloroacetic acid dissolved in benzene, whereupon the product 1,1,5,5-tetrakis[4 - (N,N - dimethylamino)phenyl]divinylcarbonium trichloroacetate was precipitated from the solution.

EXAMPLE 17

*1,1,5,5 - tetrakis[4-(N,N-dimethylamino)phenyl]divinylcarbonium heptafluorobutyrate*

To 50 ml. of the color base stock solution (see Example 16), there was added 160 mg. of heptafluorobutyric acid dissolved in benzene, whereupon the desired heptafluorobutyrate salt precipitated from the solution. The product melted with decomposition at 165–169° C.

EXAMPLE 18

*1,1,5,5 - tetrakis[4-(N,N-dimethylamino)phenyl]divinylcarbonium ethanesulfonate*

To 50 ml. of the color base stock solution (see Example 16), there was added 83 mg. of ethanesulfonic acid dissolved in ether, whereupon the desired ethanesulfonate salt precipitated from solution. The product melted at 190–195° C.

EXAMPLE 19

*1,1,5,5 - tetrakis[4-(N,N-dimethylamino)phenyl]divinylcarbonium diphenyl-4,4'-disulfonate*

To 50 ml. of the color base stock solution (see Example 16), there was added 120 mg. of diphenyl-4,4'-disulfonic acid dissolved in ethanol, whereupon the desired diphenyldisulfonate salt precipitated from solution. The product melted at 217–220° C.

EXAMPLE 20

*1,1,5,5 - tetrakis[4-(N,N-dimethylamino)phenyl]divinylcarbonium-trifluoroacetate*

To 50 ml. of the above-described color base stock solution (see Example 16), there was added 85 mg. of trifluoroacetic acid dissolved in benzene, whereupon the desired trifluoroacetate salt precipitated from solution. The product melted at 200–202° C.

EXAMPLE 21

*1,1,5,5 - tetrakis[4-(N,N-dimethylamino)phenyl]divinylcarbonium dodecylbenzenesulfonate*

To 50 ml. of the above-described color base stock solution (see Example 16), there was added 250 mg. of dodecylbenzenesulfonic acid dissolved in benzene, whereupon the desired dodecylbenzenesulfonate salt precipitated from solution.

EXAMPLE 22

*1,5 - bis[4-(N,N-dimethylamino)phenyl]-1,5-bis(phenyl)-divinylcarbonium trifluoroacetate*

A suspension of 12.0 grams of 1,5-bis[4-(N,N-dimethylamino)phenyl] - 1,5-bis(phenyl)divinylcarbonium perchlorate (see Example 5) in 50 ml. of absolute ethanol was treated with a solution of 1.5 grams of potassium hydroxide in 25 ml. of ethanol. A small amount of ether was added, and stirring was continued for a short time. More ether was added, and then the mixture was washed three times with water. The resulting organic solution was dried briefly over sodium sulfate and then filtered. The filtrate was diluted to 500 ml. with ether, and sufficient ethanol was added to dispel the turbidity which developed upon addition of the ether. (The resulting solution is referred to in this and the following Examples 23 through 26 as the "color base stock solution.") To 50 ml. of the color base stock solution described in the preceding paragraph, there was added 0.23 gram of trifluoroacetic acid dissolved in ether, whereupon the desired trifluoroacetate salt precipitated from solution. The product melted at 155–157° C.

EXAMPLE 23

*1,5 - bis[4-(N,N-dimethylamino)phenyl]-1,5-bis(phenyl)-divinylcarbonium diphenyl-4,4'-disulfonate*

To 50 ml. of the above-described color base stock solution (see Example 20), there was added 0.63 gram of diphenyl-4,4'-disulfonic acid dissolved in ethanol whereupon the desired disulfonate salt precipitated from solution. The product salt melted at 235–238° C.

EXAMPLE 24

*1,5 - bis[4-(N,N-dimethylamino)phenyl]-1,5-bis(phenyl)-divinylcarbonium dodecylbenzenesulfonate*

To 50 ml. of the above-described color base stock solution (see Example 20), there was added 0.65 gram of dodecylbenzenesulfonic acid, whereupon the desired dodecylbenzenesulfonate salt precipitated from solution.

EXAMPLE 25

*1,5 - bis[4-(N,N-dimethylamino)phenyl]-1,5-bis(phenyl)-divinylcarbonium orthophosphate*

To 50 ml. of the above-described color base stock solution (see Example 20), there was added 0.25 gram of 85 percent aqueous orthophosphoric acid dissolved in ether, whereupon the desired orthophosphate salt precipitated from solution.

EXAMPLE 26

*1,5 - bis[4-(N,N-dimethylamino)phenyl]-1,5-bis(phenyl)-divinylcarbonium zinc chloride complex*

To 50 ml. of the above-described color base stock solution (see Example 20), there was added 0.27 gram of zinc chloride dissolved in ether, whereupon the desired zinc chloride complex salt was formed and precipitated from solution. The product salt melted at 203–205° C.

The above-described carbonium compounds can be associated with the pellucid supporting solid base in numerous ways to form the products of the present invention. A preferred way in which the carbonium compound can be associated with the solid base is in the form of a continuous film of essentially pure compound coated upon the surface of the solid base. This form will provide for a maximum of reflection.

Continuous coatings of films of the compounds upon the solid supporting material can be readily applied by making a solution of the compound in a solvent which is volatile or otherwise readily removable, applying the solution uniformly to the solid surface to be coated and then removing the solvent, leaving the carbonium compound deposited upon the surface of the solid. Films can also be made by applying a solution of the alkaline (optically inactive) form of the carbonium compound, evaporating or otherwise removing the solvent, and then regenerating the colored salt form by washing with an acid.

The choice of a particular solvent to be used under any particular set of conditions will depend to some extent upon the specific carbonium compound utilized and the specific supporting base to be coated. In general, however, suitable solvents are halogenated (especially chlorinated) hydrocarbons, such as ethylene dichloride, chloroform, carbon tetrachloride, etc.; ketones, such as acetone and methyl ethyl ketone; alcohols, such as ethyl alcohol, isopropyl alcohol, butyl alcohol, etc., or aqueous solutions of such alcohols; ethers, particularly the glycol ethers, such as the Cellosolve and Carbitol mono- and di-ethers, e. g., methyl Cellosolve, ethyl Cellosolve, methyl Carbitol, diethyl Carbitol, etc. Combinations of two or more of the solvents can also be used to advantage under many circumstances. When selecting a solvent for the application of an essentially pure film of the carbonium compound upon the supporting base, it will be desirable to select a solvent having essentially no tendency to dissolve the supporting base material.

The solution of carbonium compound used to coat the solid supporting base may contain materials other than the solvents and the carbonium compounds, if the concentration of such other materials is not so high as to impair the infra-red filtering effect of the coating. For example, there may be included a lacquer material (such as a resin), cellulosic derivatives or drying oils, which will serve as bonding or protective agents to make the coating more resistant to wear or abrasion. Other possible additives includes (a) wetting or spreading agents to facilitate film formation, (b) plasticizers, e. g., dibutyl sebacate, (c) buffer combinations such as boric acid-sodium borate, (d) ultra-violet light absorbing material such as phenyl silicylate, etc., (e) dyes and/or pigments to modify the coating color for decorative and/or functional purposes not necessarily associated with control of heat.

The coating of carbonium compound can be applied as a solution by any of the usual means and methods for applying such films, e. g., by spraying, flowing, pouring or brushing upon the surface. Likewise, some of the lower melting compounds may be applied as comminuted solids dusted onto the surface and fused by the application of heat. Likewise, fused liquid carbonium compounds can be applied in the same or similar manner as solutions of the carbonium compounds. An excess of the compound or solution may be applied and the excess allowed to drain off by gravity, to be driven off by centrifugal force, or be taken off by brushing, etc.

The coating may also be applied by dipping the surface to be coated into a body of liquid and slowly removing the surface, so that the rate of drainage of the excess liquid is essentially constant. For example, with a given solution and using the dipping method, speeds of removal of from 1 to 10 inches per minute may be used in different cases, and in each case a satisfactory product will be obtained. It should be recognized, of course, that the product formed with the faster withdrawal speed will have a thicker film.

It will be recognized that the film thickness will have substantially no effect upon the degree of reflection of infra-red radiation, except to the extent that interference phenomena arise with relatively thin films. It will also be recognized, however, that the degree of absorption of both infra-red radiation and visible radiation will vary directly with film thickness. Consequently, the selection of an ultimate film thickness for any particular product will depend upon the particular requirements (with respect to transmission, absorption and/or reflection of both visible and infra-red radiation) for that product.

Instead of forming continuous coatings as described above, the carbonium compounds can be incorporated as heterogeneous dispersions within the solid pellucid supporting base, thus giving a product which will give diffuse reflection rather than spectral reflection. Such heterogeneous dispersions can be formed by utilizing a carbonium salt and a solid supporting base which are mutually insoluble in each other but which can be dissolved in a mutual solvent. Thus, a solution of a carbonium compound and the pellucid supporting base can be prepared in the mutual solvent and the solvent removed, thereby producing an intimate hetergeneous dispersion of the carbonium compound in the solid base. It is also possible in some cases to form such a heterogeneous dispersion by converting the carbonium compound to the alkaline (optically inactive) form (by reaction with an alkaline material such as sodium or potassium hydroxide, etc.—see Examples 16 and 20, above), dissolving the alkaline form of the carbonium compound in the supporting base material and then regenerating the salt form, e. g., by treating with an acid, or in the case of volatile amines, by volatilizing the alkaline material.

Homogeneous solid dispersions (i. e., solid solutions) of the carbonium compounds in a solid pellucid supporting material are also suitable as infra-red filters according to the present invention. It should be recognized, however, that such materials will act as infra-red filters almost entirely by absorption of the infra-red rather than reflection of the infra-red.

The following examples are presented as illustrative of typical products of the present invention and of the optical characteristics of such products.

EXAMPLE 27

Films of various compounds described in the preceding examples were coated upon glass, and the resulting infrared-filtering properties thereof determined. The compounds were applied to the glass by placing a few drops of a saturated solution of the compound (in a suitable solvent—usually ethylene dichloride, methyl ethyl ketone or acetone) near the center of rotation of a piece of glass spinning in a horizontal plane. In this way the solution was distributed relatively uniformly over the glass surface, with any excess being removed by centrifugal force. The radiation reflecting properties were determined by measuring specular reflection at 45° incident of radiation of various known wave lengths. Listed in the following Table I are (a) the percent reflection at 0.55 micron (the approximate visible wave length to which the average human eye is most sensitive) and (b) the approximate wave length and magnitude of maximum reflection in the infra-red (I. R.) region.

TABLE I

| Compound | Visible Reflection at 0.55, percent | I. R. Reflection | |
|---|---|---|---|
| | | Wave length, microns | Percent |
| 1,5-Bis [4-(N,N-dimethylamino) phenyl]-1,5-bis (phenyl) divinylcarbonium perchlorate | 7 | 1.10 | 33 |
| 1,1,5,5-Tetrakis [4-(N,N-dimethylamino)-phenyl] divinylcarbonium percholorate | 6 | 1.00 | 34 |
| 1,5-Bis [4-(N,N-dimethylamino) phenyl]-1,5-bis (phenyl) divinylcarbonium p-toluenesulfonate | 8 | 1.06 | 25 |
| 1,1,5,5-Tetrakis [4-(N,N-dimethylamino)-phenyl] divinylcarbonium p-toluene-sulfonate | 7 | 0.94 | 22 |
| 1,7-Bis [4-(N,N-dimethylamino) phenyl]-1,7-bis (phenyl) trivinylcarbonium perchlorate | 5 | 1.15 | 26 |
| 1,1,7,7-Tetrakis [4-(N,N-dimethylamino)-phenyl] trivinylcarbonium perchlorate | 7 | 1.15 | 40 |

EXAMPLE 28

Glass plates coated with films in the same manner as described in Example 27 were evaluated as infra-red filters by measuring the percent transmission of visible radiation (as measured by a Welsch densitometer) and the percent transmission of radiation of various wave lengths in the infra-red. Similar measurements were also made upon plastic films coated with solutions of the various compounds. The results of these measurements are listed in Table II. The location and magnitude of minimum transmission is listed for the infra-red region.

TABLE II

| Compound | Film Base | Visible Transmission, Percent | I. R. Transmission | |
|---|---|---|---|---|
| | | | Wave length, microns | Percent |
| 1,7-Bis [4-(N,N-dimethylamino) phenyl]-1,7-bis-(phenyl) trivinylcarbonium perchlorate. | Glass | 68 | 1.00 | 33 |
| 1,1,5,5-Tetrakis [4-N,N-dimethylamino) phenyl]-divinylcarbonium trifluoroacetate. | do | 81 | 0.85 | 35 |
| 1,3-Bis [4-(N,N-dimethylamino) phenyl]-1,3-bis-(phenyl) vinylcarbonium perchlorate. | do | 75 | 0.85 | 30 |
| 1,7-Bis [4-(N,N-dimethylamino) phenyl]-1,7-bis-(phenyl) trivinylcarbonium trifluoroacetate. | do | 75 | 0.90 | 8 |
| 1,1,3-Tris [4-(N,N-dimethylamino) phenyl]-3-(phenyl) vinylcarbonium perchlorate. | do | 83 | 0.80 | 43 |
| 1,5-Bis [4-(N,N-dimethylamino) phenyl]-1,5-bis-(4-chlorophenyl) divinylcarbonium perchlorate. | do | 81 | 1.00 | 48 |
| 1,5-Bis [4-(N,N-dimethylamino) phenyl]-1,5-bis-(phenyl) divinylcarbonium trifluoroacetate. | do | 75 | 0.90 | 30 |
| 1,1,5,5-[4-(N,N-dimethylamino) phenyl] divinylcarbonium zinc chloride complex. | do | 76 | 0.80 | 25 |
| 1,7-Bis [4-(N,N-dimethylamino) phenyl]-1,7-bis-(phenyl) trivinylcarbonium perchlorate. | Ethylene glycol-terphthalic acid polyester. | 74 | 0.95 | 27 |
| Do | Cellulose Acetate | 75 | 0.95 | 10 |

EXAMPLE 29

A three inch square glass plate was coated with a film of 1,7-bis[4-(N,N-dimethylamino)phenyl]-1,7-bis(phenyl)trivinylcarbonium perchlorate by applying an 0.8 weight percent solution of the perchlorate in ethylene dichloride to one surface of the glass and evaporating the solvent. Transmittance of radiation varied from about 80 percent to about 65 percent at wave lengths between 400 and 620 millimicrons, but dropped to less than 30 percent at wave lengths of 700 millimicrons and above. Reflectance varied from about 5 percent to about 10 percent between 400 and 620 millimicrons, but from about 25 percent to about 35 percent between 700 and 1000 millimicrons.

We claim:

1. A solid pellucid material having physically associated therewith a bis(p-aminophenyl)vinyl carbonium compound of the class

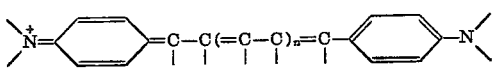

wherein $n$ is equal to 0, 1, 2 or 3, said compound having an acid attached to one of the non-terminal carbon atoms of the linear chain joining the aromatic rings.

2. A solid pellucid sheet of material having dissolved therein a bis(p-aminophenyl)vinyl carbonium compound of the class

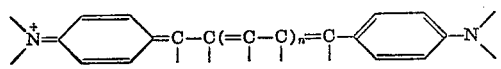

wherein $n$ is equal to 0, 1, 2 or 3, said compound having an acid attached to one of the non-terminal carbon atoms of the linear chain joining the aromatic rings.

3. A solid pellucid sheet of material having coated thereon a film of a bis(p-aminophenyl)vinyl carbonium compound of the class

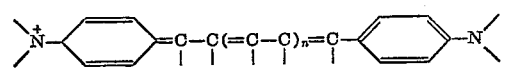

4. A solid pellucid sheet of material having coated thereon a film of a bis(p-aminophenyl)vinyl carbonium salt of the class

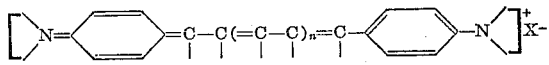

wherein $n$ is equal to 0, 1, 2 or 3 and $X^-$ is the anion of a strong acid.

5. A solid pellucid sheet of material having coated thereon a film of a bis(p-aminophenyl)vinylcarbonium salt of the class

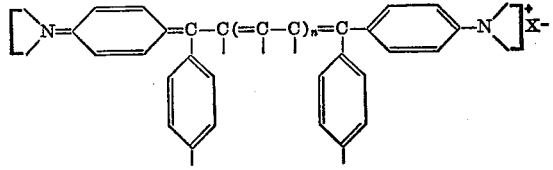

wherein $n$ is equal to 0, 1, 2 or 3 and $X^-$ is the anion of a strong acid.

6. A solid pellucid sheet of material having coated thereon a film of a bis(p-aminophenyl)vinylcarbonium salt of the class

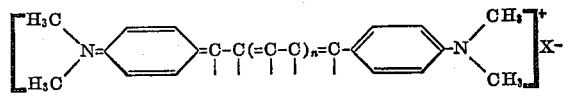

wherein $n$ is equal to 0, 1, 2 or 3 and $X^-$ is the anion of a strong acid.

7. A solid pellucid sheet of material having coated thereon a film of a 1,7-bis(p-aminophenyl)trivinylcarbonium salt of a strong acid.

8. A solid pellucid sheet of material having coated thereon a film of a 1,7-bis[4-(N,N-dimethylamino)phenyl]-1,7-bis(phenyl)trivinylcarbonium salt of a strong acid.

9. A solid pellucid sheet of material having coated thereon a film of a 1,5-bis(p-aminophenyl)divinylcarbonium salt of a strong acid.

10. A solid pellucid sheet of material having coated thereon a film of a 1,5-bis[4-(N,N-dimethylamino)phenyl]-1,5-bis(phenyl)divinylcarbonium salt of a strong acid.

11. A solid pellucid sheet of material having coated thereon a film of a 1,1,5,5-tetrakis[4-(N,N-dimethylamino)phenyl]divinylcarbonium salt of a strong acid.

References Cited in the file of this patent

UNITED STATES PATENTS

| 2,193,035 | Matthews | Mar. 2, 1940 |
| 2,298,733 | Brooker et al. | Oct. 13, 1942 |
| 2,631,499 | Riley | Mar. 17, 1953 |
| 2,632,004 | Minsk et al. | Mar. 17, 1953 |